US012755220B2

(12) United States Patent
Kim

(10) Patent No.: US 12,755,220 B2
(45) Date of Patent: Oct. 6, 2026

(54) APPARATUS AND METHOD FOR ESTIMATING TRAFFIC VOLUME BASED ON DEMAND OF ROUTE SEARCH

(71) Applicants: HYUNDAI MOTOR COMPANY, Seoul (KR); KIA CORPORATION, Seoul (KR)

(72) Inventor: Nam Hyuk Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 83 days.

(21) Appl. No.: 18/668,769

(22) Filed: May 20, 2024

(65) Prior Publication Data

US 2025/0148381 A1 May 8, 2025

(30) Foreign Application Priority Data

Nov. 8, 2023 (KR) ........................ 10-2023-0153368

(51) Int. Cl.
*G06Q 10/047* (2023.01)

(52) U.S. Cl.
CPC .................................. *G06Q 10/047* (2013.01)

(58) Field of Classification Search
None
See application file for complete search history.

(56) References Cited

U.S. PATENT DOCUMENTS

2020/0033151 A1* 1/2020 Seshadri ................ G01C 21/20
2022/0327924 A1* 10/2022 To .......................... G08G 1/065
2024/0054889 A1* 2/2024 Yamada ............... G08G 1/0125

FOREIGN PATENT DOCUMENTS

JP 7207531 B2 1/2023
WO WO-2021244905 A1 * 12/2021 ........... G06Q 10/047

OTHER PUBLICATIONS

Machine Translation of WO2021244905 A1 (Year: 2021).*

* cited by examiner

*Primary Examiner* — Brandon D Lee
(74) *Attorney, Agent, or Firm* — MCDONNELL BOEHNEN HULBERT & BERGHOFF LLP

(57) ABSTRACT

An apparatus for estimating a traffic volume based on demand for route search, includes a processor and a storage medium configured to record one or more programs configured to be executable by the processor. The processor is configured to collect a plurality of pieces of route search data, generate route search demand data based on the collected plurality of pieces of route search data, correct the route search demand data based on an overcrowded road exceeding a marginal traffic volume, and estimate an actual traffic volume for each road by applying the corrected route search demand data to a pre-trained learning model.

16 Claims, 6 Drawing Sheets

$$D_{over,0} = max(D_0 - F_{max}, 0) = \begin{bmatrix} 0 \\ 356-300 \\ 0 \\ 327-190 \\ 0 \\ 0 \end{bmatrix} = \begin{bmatrix} 0 \\ 56 \\ 0 \\ 97 \\ 0 \\ 0 \end{bmatrix}$$

FIG. 4A $$U_{over,0} = u(D_{over,0}) = \begin{bmatrix} 0 \\ 1 \\ 0 \\ 1 \\ 0 \\ 0 \end{bmatrix}$$

FIG. 4B $$P_{prop,0} = \begin{bmatrix} 0 & 0 & 0.2 & 0.2 & 0 & 0 \\ 0 & 0.8 & 0.2 & 0.2 & 0 & 0 \\ 0 & 0 & 1 & 0 & 0 & 0 \\ 0 & 0 & 0 & 0.8 & 0.2 & 0 \\ 0 & 0 & 0 & 0 & 1 & 0 \\ 0 & 0 & 0 & 0 & 0.2 & 0 \end{bmatrix}$$

FIG. 4C $$D_{over,0}^{prop} = \begin{bmatrix} 97*0.2 \\ 56*0.8+97*0.2 \\ 0 \\ 97*0.8 \\ 0 \\ 0 \end{bmatrix} = \begin{bmatrix} 19.4 \\ 28.36 \\ 0 \\ 77.6 \\ 0 \\ 0 \end{bmatrix}$$

FIG. 4D $$D_{over,0} \; \begin{bmatrix} 0 \\ 56 \\ 0 \\ 97 \\ 0 \\ 0 \end{bmatrix} \xrightarrow{\text{DISPERSION TO UPSTREAM ROAD}} D_{over,0}^{prop} \; \begin{bmatrix} 19.4 \\ 28.36 \\ 0 \\ 77.6 \\ 0 \\ 0 \end{bmatrix}$$

FIG. 4E $$R_0 = \begin{bmatrix} 58 \\ 0 \\ 79 \\ 0 \\ 6 \\ 39 \end{bmatrix} \qquad R_0^{(1)} = \begin{bmatrix} 58 \\ 0 \\ 79 \\ 0 \\ 6 \\ 39 \end{bmatrix} - \begin{bmatrix} 19.4 \\ 28.36 \\ 0 \\ 77.6 \\ 0 \\ 0 \end{bmatrix} = \begin{bmatrix} 38.6 \\ 0 \\ 79 \\ 0 \\ 6 \\ 39 \end{bmatrix}$$

FIG. 4F $$D_{over,0}^{(1)} = max\left( \begin{bmatrix} 19.4 \\ 28.36 \\ 0 \\ 77.6 \\ 0 \\ 0 \end{bmatrix} - \begin{bmatrix} 58 \\ 0 \\ 79 \\ 0 \\ 6 \\ 39 \end{bmatrix}, 0 \right) = \begin{bmatrix} 0 \\ 28.36 \\ 0 \\ 77.6 \\ 0 \\ 0 \end{bmatrix}$$

FIG. 4G

APPARATUS AND METHOD FOR ESTIMATING TRAFFIC VOLUME BASED ON DEMAND OF ROUTE SEARCH

CROSS REFERENCE TO RELATED APPLICATIONS

This application claims benefit of priority to Korean Patent Application No. 10-2023-0153368 filed on Nov. 8, 2023 in the Korean Intellectual Property Office, the disclosure of which is incorporated herein by reference in its entirety.

BACKGROUND

1. Field

The present disclosure relates to an apparatus and method for estimating a traffic volume based on demand for route search.

2. Description of Related Art

Due to a rapid increase in societal vehicle penetration, the number of vehicles has been exponentially growing. Conversely, an amount of roads is not even close thereto. Accordingly, a traffic volume on a road may increase, and thus it is necessary to accurately estimate the traffic volume on the road so as to calculate an estimated time of arrival (ETA).

In order to estimate a traffic volume on a road, route search data (for example, a road ID of a road and a predicted time of entry on the road) retrieved from multiple vehicles may be used. However, the route search data may show a traffic volume overestimated in comparison to an actual traffic volume. For example, a road may have an allowable marginal traffic volume (that is, the maximum number of vehicles). When the collected route search data is used, the collected route search data may show more vehicles traveling on a particular road than the marginal traffic volume, resulting in an overestimation of traffic.

In other cases, the route search data may show a traffic volume underestimated in comparison to an actual traffic volume. For example, when a vehicle is travelling without route search, when a vehicle travelling with route search leaves a road included in a route, or when a new vehicle enters a road after a point in time at which a traffic volume is estimated, the traffic volume may be underestimated.

Accordingly, when route search data is used to estimate a traffic volume, it may be necessary to accurately estimate an actual traffic volume by reflecting overestimation and underestimation cases.

SUMMARY

An aspect of the present disclosure provides an apparatus and method for estimating a traffic volume based on demand for route search in which an actual traffic volume may be accurately estimated for each road, thereby improving route search reliability and user satisfaction.

According to an aspect of the present disclosure, there is provided an apparatus for estimating a traffic volume based on demand for route search, the apparatus including a processor, and a storage medium configured to record one or more programs configured to be executable by the processor. The processor may be configured to collect a plurality of pieces of route search data, generate route search demand data based on the collected plurality of pieces of route search data, correct the route search demand data based on an overcrowded road exceeding a marginal traffic volume, and estimate an actual traffic volume for each road by applying the corrected route search demand data to a pre-trained learning model.

According to another aspect of the present disclosure, there is provided a method for estimating a traffic volume based on demand for route search, the method including collecting a plurality of pieces of route search data, generating route search demand data based on the collected plurality of pieces of route search data, correcting the route search demand data based on an overcrowded road exceeding a marginal traffic volume, and estimating an actual traffic volume for each road by applying the corrected route search demand data to a pre-trained learning model.

According to another aspect of the present disclosure, there is provided a computer-readable storage medium storing a program for executing the method on a computer.

According to an example embodiment of the present disclosure, route search demand data may be corrected based on a marginal traffic volume, and then the corrected route search demand data may be applied to a pre-trained learning model, thereby accurately estimating an actual traffic volume for each road. As a result, the quality of navigation directions may be improved.

In particular, when a specific road is expected to be congested due to an increased traffic volume, such as during a holiday, an actual traffic volume estimated may be used to guide a detour route for a specific congested road, thereby improving route search reliability and user satisfaction.

BRIEF DESCRIPTION OF THE FIGURES

The above and other aspects, features, and advantages of the present disclosure will be more clearly understood from the following detailed description, taken in conjunction with the accompanying drawings, in which:

FIGS. 4A, 4B, 4C, 4D, 4E, 4F, and 4G are an exemplary diagram illustrating a calculation process for correcting route search demand data at a specific point in time (t=0) according to an example embodiment of the present disclosure;

DETAILED DESCRIPTION

Hereinafter, specific example embodiments of the present disclosure will be described with reference to the accompanying drawings. The following detailed description is provided to aid in a comprehensive understanding of a method, a device and/or a system described in the present specification. However, the detailed description is for illustrative purposes only, and the present disclosure is not limited thereto.

In describing the example embodiments of the present disclosure, when it is determined that a detailed description of a known technology related to the present disclosure may unnecessarily obscure the gist of the present disclosure, a detailed description thereof will be omitted. In addition, terms to be described later are terms defined in consideration of functions in the present disclosure, which may vary depending on intention or custom of a user or operator. Therefore, the definition of these terms should be made based on the contents throughout the present specification. The terminology used herein is for the purpose of describing particular example embodiments only and is not to be limiting of the example embodiments. As used herein, the singular forms “a,” “an,” and “the” are intended to include the plural forms as well, unless the context clearly indicates otherwise. As used herein, the term “and/or” includes any one and any combination of any two or more of the associated listed items. It will be further understood that the terms “comprises” and/or “comprising,” when used in this specification, specify the presence of stated features, integers, steps, operations, elements, components or a combination thereof, but do not preclude the presence or addition of one or more other features, integers, steps, operations, elements, components, and/or groups thereof.

Figure 1:
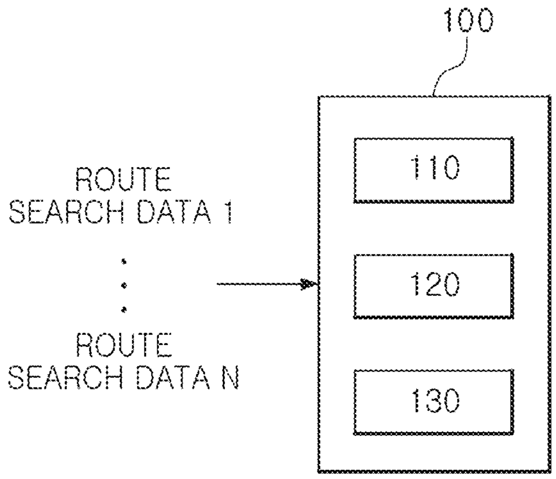
FIG. 1 is a diagram illustrating a route search demand-based traffic volume estimation apparatus according to an example embodiment of the present disclosure.

FIG. 1 is a diagram illustrating a route search demand-based traffic volume estimation apparatus according to an example embodiment of the present disclosure. A route search demand-based traffic volume estimation apparatus 100 may include a data collection unit 110, a control unit 120, and a storage unit 130.

The route search demand-based traffic volume estimation apparatus 100 may include a processor (for example, a computer, a microprocessor, a CPU, an ASIC, a logic circuit, or the like) and a memory storing software instructions providing functions of the control unit 120 when executed by the processor. Here, the processor and the memory may be implemented as separate semiconductor circuits. Alternatively, the processor and the memory may be implemented as a single integrated semiconductor circuit. The number of processors may be one or more.

First, the data collection unit 110 may collect a plurality of pieces of route search data (route search data 1 to route search data N). The collected plurality pieces of route search data may be transmitted to the control unit 120. Here, each of the plurality pieces of route search data may include a road ID of each of roads, included in a route searched by a vehicle, and a predicted entry time for each road.

Subsequently, the control unit 120 may generate route search demand data based on the collected plurality pieces of route search data, and may correct the route search demand data based on an overcrowded road exceeding a marginal traffic volume. Here, the route search demand data may represent a traffic volume for each road estimated based on the road ID and the predicted entry time, and the traffic volume may represent the number of vehicles. That is, the route search demand data may be estimated as a traffic volume on a road at a predicted entry time of the road having a specific road ID. In addition, the marginal traffic volume may represent the maximum number of vehicles set for each road, and the overcrowded road may be a road on which an estimated traffic volume exceeds the marginal traffic volume.

In order to correct the route search demand data, the control unit 120 may disperse, with respect to the overcrowded road, an excess demand traffic volume exceeding the marginal traffic volume to an upstream road connected to the overcrowded road. Here, the upstream road may be a road connected to the overcrowded road in a reverse direction of a direction of travel.

Specifically, the control unit 120 may repeatedly calculate a process of dispersing the excess demand traffic volume to the upstream road according to a preset percentage, and may end the process, when a total sum of excess demand traffic volumes for respective roads, after dispersion is performed, is less than or equal to a certain percentage of a total sum of marginal traffic volumes for respective roads.

Figure 2A:
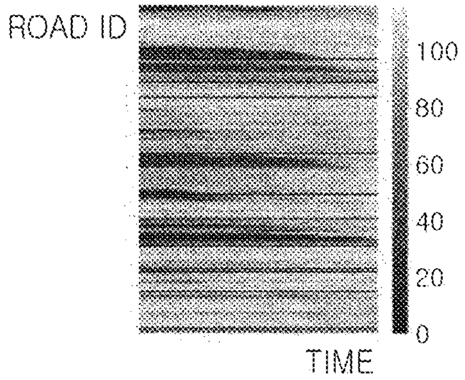
FIGS. 2A, 2B, and 2C are a diagram illustrating a relationship between a traffic volume estimated based on route search data and an actual traffic volume according to an example embodiment of the present disclosure.
Figure 2B:
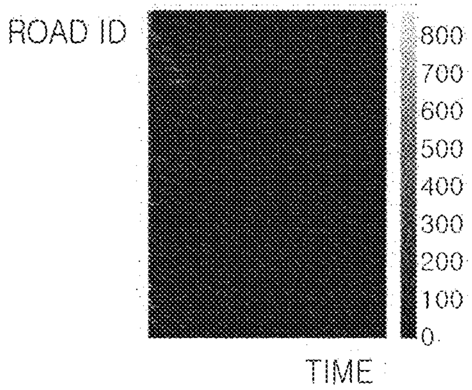
Figure 2C:
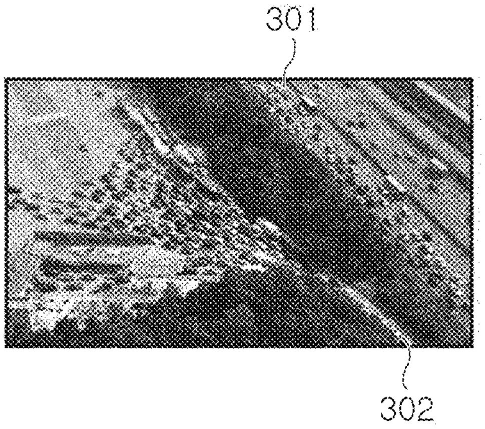

FIG. 2 is a diagram illustrating a relationship between a traffic volume estimated based on route search data and an actual traffic volume according to an example embodiment of the present disclosure. FIG. 2A illustrates a vehicle speed for each road ID over time. A darker color may represent a slower vehicle speed. FIG. 2B illustrates a traffic volume estimated for each road ID over time. A darker color may represent an estimated traffic volume. FIG. 2C illustrates a bottleneck phenomenon occurring on a second road entering a first road due to a large traffic volume on the first road.

That is, as illustrated in FIGS. 2A and 2B, it can be seen that as a traffic volume estimated based on route search data increases, a vehicle speed decreases accordingly. As a result, it can be seen that the traffic volume estimated based on the route search data and an actual traffic volume shows a similar flow.

In addition, as illustrated in FIG. 2C, when a traffic volume on a first road 301 increases, a vehicle speed on the second road 302 may decrease after a certain period of time, resulting in a bottleneck phenomenon. That is, in the case of roads having a certain connection relationship, when a marginal traffic volume is exceeded on one road 301, the traffic volume may be dispersed to another road 302 connected to the road 301 after a certain point in time.

Accordingly, according to the present disclosure, a traffic volume of each road may be estimated based on route search data. In the case of an overcrowded road on which the estimated traffic volume exceeds a marginal traffic volume, excess demand traffic volume may be dispersed to an upstream road to correct route search demand data.

Hereinafter, an example embodiment of correcting route search demand data based on a connection relationship between roads, route search demand data, and a marginal traffic volume will be described.

Figure 3:
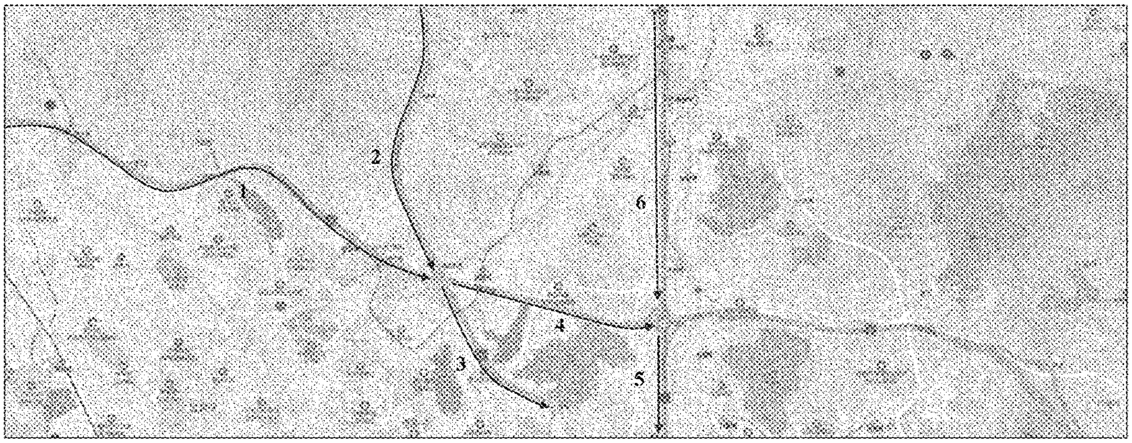
FIG. 3 is a diagram illustrating a connection relationship between roads according to a direction of travel according to an example embodiment of the present disclosure.

First, FIG. 3 is a diagram illustrating a connection relationship between roads according to a direction of travel according to an example embodiment of the present disclosure. Both rows and columns may represent road IDs.

As illustrated in FIG. 3, it is assumed that a road includes roads 1 to 6 in a direction of travel. Road 1 may be connected to roads 3 and 4, road 2 may be connected to roads 3 and 4, road 4 may be connected to road 5, road 6 may be connected to road 5, and a connection relationship (A) between the roads may be represented by a matrix below. In the matrix below, rows and columns may represent road IDs. In addition, the terms upstream or downstream are based on the driving direction. For example, road 1 may be an upstream road of roads 3 and 4, and conversely, roads 3 and 4 may be downstream roads of road 1.

$$A = \begin{bmatrix} 0 & 0 & 1 & 1 & 0 & 0 \\ 0 & 0 & 1 & 1 & 0 & 0 \\ 0 & 0 & 0 & 0 & 0 & 0 \\ 0 & 0 & 0 & 0 & 1 & 0 \\ 0 & 0 & 0 & 0 & 0 & 0 \\ 0 & 0 & 0 & 0 & 1 & 0 \end{bmatrix}$$

According to an example embodiment of the present disclosure, route search demand data and a marginal traffic volume may be represented by a matrix.

Specifically, route search demand data D may be represented by a matrix below. Rows may represent road IDs, that is, roads 1 to 6, and columns may represent a plurality of specific points in time, that is, points in time 1 to 6 having a predetermined time interval. That is, the route search demand data D may represent a traffic volume for each road estimated based on a road ID and a predicted entry time. For example, a traffic volume on road 1 at point in time 1 may be 142, and a traffic volume on road 6 at a point in time 2 may be 199.

$$D = \begin{bmatrix} 142 & 152 & 155 & 158 & 166 & 152 \\ 356 & 370 & 371 & 368 & 351 & 359 \\ 171 & 195 & 186 & 180 & 179 & 183 \\ 327 & 327 & 340 & 346 & 338 & 328 \\ 184 & 172 & 173 & 186 & 190 & 184 \\ 201 & 199 & 194 & 195 & 196 & 199 \end{bmatrix}$$

In addition, a marginal traffic volume ($F_{max}$) may be represented by a matrix below. Rows may represent road IDs, that is, roads 1 to 6. For example, a marginal traffic volume ($F_{max}$) of road 1 may be 200, and a marginal traffic volume of road 4 may be 190.

$$F_{max} = \begin{bmatrix} 200 \\ 300 \\ 250 \\ 190 \\ 230 \\ 240 \end{bmatrix}$$

Table 1 below shows equations used to correct route search demand data.

TABLE 1

| NUMBER | EQUATION |
|---|---|
| 1 | $D_{over,t} = \max(D_t - F_{max}, 0)$ |
| 2 | $D_{over} = [D_{over,0} \ldots D_{over,T}]$ |
| 3 | $U_{over} = u(D_{over})$ |
| 4 | $P_{prop,t} = \alpha * \text{diag}(U_{over,t}) * I + (1-\alpha) * A$ |
| 5 | $D_{over,t}^{prop} = P_{prop,t} * D_{over,t}$ |
| 6 | $D_{over}^{prop} = [P_{prop,0} * D_{over,0} \ \ldots \ P_{prop,T} * D_{over,T}]$ |
| 7 | $R_t = \max(F_{max} - D_t, 0)$ |
| 8 | $R = [R_0 \ldots R_T]$ |
| 9 | $R_t^{(n)} = R_t^{(n-1)} - D_{over,t}^{prop}$ |

TABLE 1-continued

| NUMBER | EQUATION |
|---|---|
| 10 | $D_{over}^{(n)} = \max\left(D_{over,t}^{prop} - R_t^{(n-1)}, 0\right)$ |
| 11 | $D^{(n)} = D^{(n-1)} + \left[D_{add,0}^{(n)} \ \ldots \ D_{add,T}^{(n)}\right]$ |

In Equation 1, $D_{over,t}$ may be a matrix representing an excess demand traffic volume for each road at a specific point in time t, $D_t$ may be a matrix representing a traffic volume for each road estimated at a specific in point t, and $F_{max}$ may be a matrix representing a marginal traffic volume for each road.

In Equation 2, $D_{over}$ may be a matrix listing $D_{over,t}$ for all points in time (0 to T).

In Equation 3, $U_{over}$ may be a unit matrix of $D_{over}$.

In Equation 4, $P_{prop,t}$ may be a matrix representing a dispersion percentage at a specific point in time t, α may be a dispersion percentage (constant), $U_{over,t}$ may be a unit matrix of a matrix representing an excess demand traffic volume for each road at a specific point in time t, diag ( ) may be a function turning $U_{over,t}$ into a diagonal matrix, I may be a unit matrix, and A may be a matrix representing a connection relationship between roads according to a direction of travel.

In Equation 5, $$D_{over,t}^{prop}$$

may be a matrix representing a dispersion volume for an excess demand traffic volume for each road at a specific point in time t.

In Equation 6, $$D_{over}^{prop}$$

may be a matrix listing $$D_{over,t}^{prop}$$

for all points in time.

In Equation 7, $R_t$ may be a matrix representing the spare demand traffic volume for each road at a specific point in time t, and $D_t$ is the estimated traffic volume for each road at a specific point in time t.

In Equation 8, R may be a matrix listing $R_t$ with respect to all points in time.

In Equation 9, $$R_t^{(n)}$$

may be a matrix representing spare demand after dispersion is performed n times for each road at a specific point in time t.

In Equation 10, $$D_{over}^{(n)}$$

may be a matrix representing an excess demand traffic volume after dispersion is performed n times.

In Equation 11, $D^{(n)}$ may represent route search demand data after dispersion is performed n times, and $$D_{add,t}^{(n)}$$

may represent a traffic volume added or subtracted for each road after dispersion is performed n times at a specific point in time t.

FIG. 4 is an exemplary diagram illustrating a calculation process for correcting route search demand data at a specific point in time (t=0) according to an example embodiment of the present disclosure.

Hereinafter, to assist in understanding of the present disclosure, a calculation process of correcting route search demand data D at a specific point in time (t=0) will be described as an example with reference to FIGS. 1, 3, 4, Table 1, and the above-described matrices (D, $F_{max}$, and A). In Table 1, it may be assumed that a is 0.8.

First, the control unit 120 may obtain $D_{over,0}$ and $U_{over,0}$, as illustrated in FIGS. 4A and 4B (see Equations 1 and 3 in Table 1). Here, $D_{over,0}$ may be a matrix representing an excess demand traffic volume for each road at a specific point in time t=0, and $U_{over,0}$ may be a unit matrix of $D_{over,0}$, as described above. Accordingly, it can be seen that an excess demand traffic volume on road 2 is 56 and an excess demand traffic volume on road 4 is 97 at a specific point in time t=0.

Subsequently, the control unit 120 may obtain $P_{prop,0}$ and $$D_{over,0}^{prop}$$

as illustrated in FIGS. 4C and 4D (see Equations 4 and 5 in Table 1). $P_{prop,0}$ may be a matrix representing a dispersion percentage at a specific point in time t=0, and $$D_{over,0}^{prop}$$

may be a matrix representing a dispersion volume for an excess demand traffic volume for each road at a specific point in time t=0, as described above.

Accordingly, after dispersion is performed, as illustrated in FIG. 4E, it can be seen that an excess demand traffic volume (97) on road 4 is reduced from 97 to 77.6 (=97*0.8), and dispersion is performed by 19.4 (=97*0.2) on road 1 and road 4. In addition, it can be seen that an excess demand traffic volume (56) on road 2 is reduced to 28.36.

Thereafter, the control unit 120 may obtain $R_0$ and $$R_o^{(1)}$$

as illustrated in FIG. 4F (see Equations 7 and 9 in Table 1). Here, $R_0$ may be a matrix representing a spare demand traffic volume for each road, and $$R_o^{(1)}$$

may be a matrix representing a spare demand traffic volume for each road after dispersion is performed once, as described above.

Accordingly, after dispersion is performed, road 1 may have a spare demand traffic volume of 38.6, road 3 may have a spare demand traffic volume of 79, and road 6 may have a spare demand traffic volume of 39.

Thereafter, the control unit 120 may obtain $$D_{over,o}^{(1)}$$

as illustrated in FIG. 4G (see Equation 10 in Table 1). Here, $$D_{over,o}^{(1)}$$

may represent an excess demand traffic volume after dispersion is performed once at a specific point in time t=0. That is, road 4 may have an excess demand traffic volume reduced to 77.5, and road 1 may have an excess demand traffic volume reduced to 28.36.

In this case, the control unit 120 may obtain a total sum (77.6+28.38=105.98) of excess demand traffic volumes for respective roads after dispersion is performed, may determine whether the obtained total sum is less than or equal to a certain percentage (for example, 10%) of a total sum (200+300+250+230+190+240=1410) of marginal traffic volumes for respective roads 240=1410, and may end the above-described process when the obtained total sum is less than or equal to the certain percentage (for example, 10%) of the total sum (200+300+250+230+190+240=1410) of the marginal traffic volumes for respective roads. However, when the obtained total sum exceeds the certain percentage (for example, 10%) of the total sum (200+300+250+230+190+240=1410) of the marginal traffic volumes for respective roads, the above-described process may be repeatedly performed.

Finally, the control unit 120 may obtain route search demand data $D^{(1)}$ corrected after dispersion is performed once according to Equation 11 in Table 1 (see Equation 11 in Table 1). That is, the route search demand data $D^{(1)}$ corrected after dispersion is performed once may be obtained by adding a traffic volume D, that is, $$D_{add,0}^{(n)}$$

$$D_{add,T}^{(n)}$$

added or subtracted when dispersion is performed once to initial route search demand data $D^{(0)}$.

Thereafter, the control unit 120 may estimate an actual traffic volume for each road by applying the corrected route search demand data to a pre-trained learning model.

The above-described learning model may include a generative adversarial network (GAN) including a generator and a discriminator.

Figure 5:
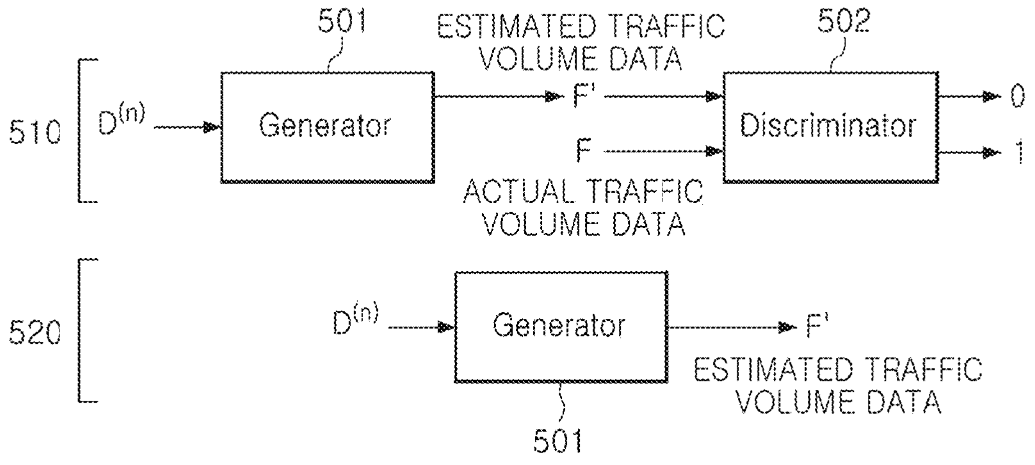
FIG. 5 is a diagram illustrating a learning model according to an example embodiment of the present disclosure.

FIG. 5 is a diagram illustrating a learning model according to an example embodiment of the present disclosure.

As illustrated in FIG. 5, during training 510, the control unit 120 may training a discriminator 502 using estimated traffic volume data F' and actual traffic volume data F. That is, the estimated traffic volume data F' may be trained as false (0) and the actual traffic volume data F may be trained as true (1). Thereafter, a generator 501 may be trained in a direction of deceiving the trained discriminator 502. Here, the estimated traffic volume data F' may be the number of vehicles for each road generated by the generator 501 based on the corrected route search demand data $D^{(a)}$, and the actual traffic volume data F may be the actual number of vehicles for each road.

Thereafter, during estimation 520, the generator 501 may receive the corrected route search demand data $D^{(n)}$ and generate actual traffic volume data F'.

In the present disclosure, the generative adversarial network may be exemplified as a learning model, but it should be noted that the present disclosure is not limited thereto.

Finally, the storage unit 130 may store various programs and data to implement functions performed by the control unit 120 described above. In addition, the above-described data may include route search data, route search demand data, a marginal traffic volume, corrected route search demand data, and the like.

As described above, according to an example embodiment of the present disclosure, route search demand data may be corrected based on a marginal traffic volume, and then the corrected route search demand data may be applied to a pre-trained learning model, thereby accurately estimating an actual traffic volume for each road. As a result, the quality of navigation directions may be improved.

In particular, when a specific road is expected to be congested due to an increased traffic volume, such as during a holiday, it may be used to guide a detour route for a specific congested road, thereby improving route search reliability and user satisfaction.

Figure 6:
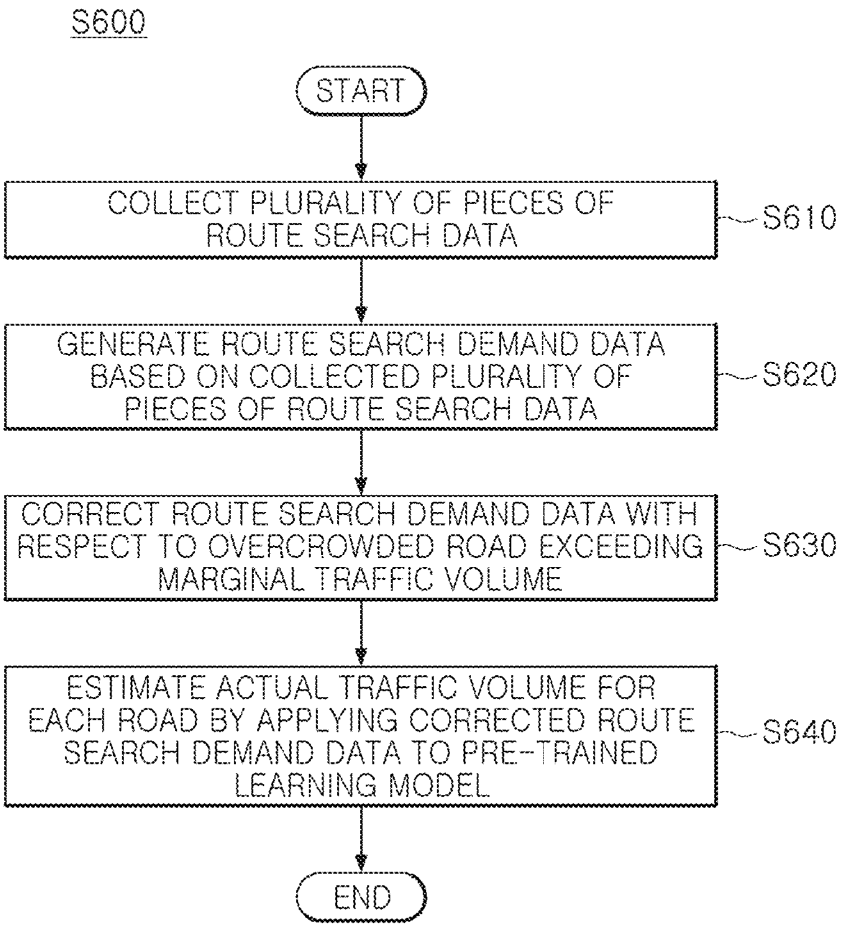
FIG. 6 is a flowchart illustrating a route search demand-based traffic volume estimation method according to an example embodiment of the present disclosure.
Figure 7:
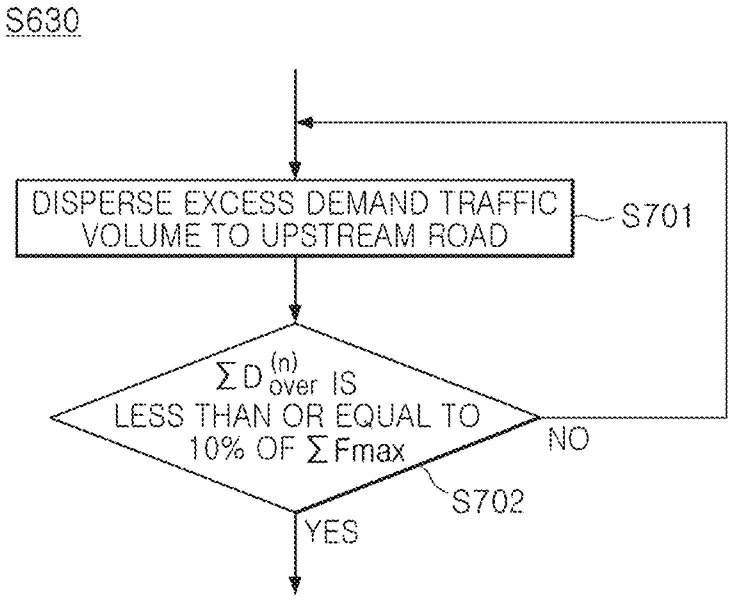
FIG. 7 is a flowchart specifically illustrating operation of FIG. 6.

FIG. 6 is a flowchart illustrating a route search demand-based traffic volume estimation method according to an example embodiment of the present disclosure. FIG. 7 is a flowchart specifically illustrating operation S630 of FIG. 6.

Hereinafter, a route search demand-based traffic volume estimation method (S600) according to an example embodiment of the present disclosure will be described with reference to FIGS. 1 to 7. However, for simplification of the disclosure, descriptions overlapping those of FIGS. 1 to 5 will be omitted.

Referring to FIGS. 1 to 7, the route search demand-based traffic volume estimation method (S600) according to an example embodiment of the present disclosure may start with an operation of collecting a plurality of pieces of route search data (route search data 1 to route search data N) (S610). Here, each of the plurality of pieces of route search data may include a road ID of each of roads, included in a route searched by a vehicle, and a predicted entry time for each road, as described above.

Subsequently, the traffic volume estimation apparatus 100 may generate route search demand data based on the collected plurality of pieces of route search data (S620). The above-described route search demand data may represent a traffic volume for each road estimated based on the road ID and the predicted entry time, and the traffic volume may be the number of vehicles, as described above.

Subsequently, the traffic volume estimation apparatus 100 may correct route search demand data based on an overcrowded road exceeding a marginal traffic volume (S630). The above-described marginal traffic volume may represent the maximum number of vehicles set for each road, and the overcrowded road may be a road having an estimated traffic volume exceeding the marginal traffic volume, as described above.

That is, as illustrated in FIG. 7, the traffic volume estimation apparatus 100 may disperse an excess demand traffic volume exceeding the marginal traffic volume to an upstream road connected to the overcrowded road (S701). Here, the upstream road may be a road connected to the overcrowded road in a reverse direction of a direction of travel, as described above.

Thereafter, the traffic volume estimation apparatus 100 may determine whether a total sum $$\left(\sum D_{over}^{(n)}\right)$$

of excess demand traffic volumes $$\left(D_{over}^{(n)}\right)$$

for respective roads is less than or equal to a certain percentage of a total sum ($\Sigma F_{max}$) of marginal traffic volumes ($F_{max}$) for respective roads (S702). As a result of the determination, when $$\sum D_{over}^{(n)}$$

is less than or equal to a certain percentage (for example, 10%) of $\Sigma F_{max}$, the traffic volume estimation apparatus 100 may end the process. When $$\sum D_{over}^{(n)}$$

exceeds the certain percentage, operations S701 and S702 may be repeatedly performed.

Finally, the traffic volume estimation device 100 may estimate an actual traffic volume for each road by applying the corrected route search demand data to a pre-trained learning model (S640).

Specifically, the above-described learning model may include a generative adversarial network (GAN) including a generator and a discriminator, and the discriminator may be trained using estimated traffic volume data and actual traffic volume data, and then the generator may be trained in a direction of deceiving the trained discriminator, as described above.

As described above, according to an example embodiment of the present disclosure, route search demand data may be corrected based on a marginal traffic volume, and then the corrected route search demand data may be applied to a pre-trained learning model, thereby accurately estimating an actual traffic volume for each road. As a result, the quality of navigation directions may be improved.

In particular, when a specific road is expected to be congested due to an increased traffic volume, such as during a holiday, it can be used to guide a detour route for a specific congested road, thereby improving route search reliability and user satisfaction.

Figure 8:
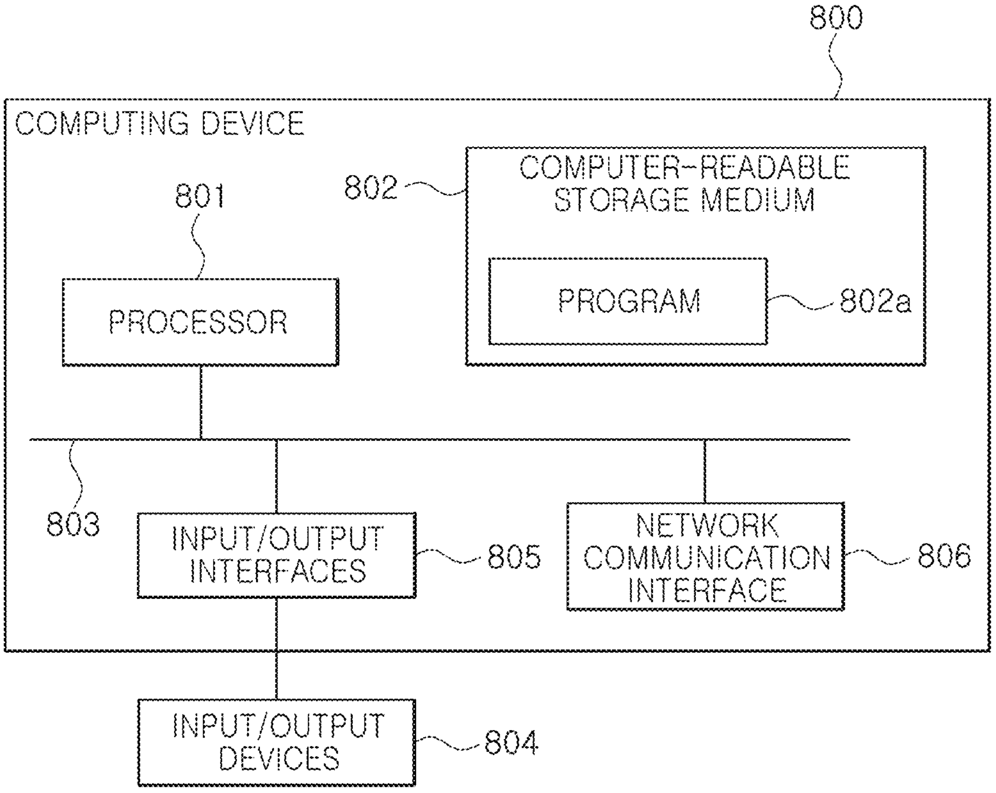
FIG. 8 is a block diagram illustrating a computing device capable of fully or partially implementing a route search demand-based traffic volume estimation apparatus according to an example embodiment of the present disclosure.

FIG. 8 is a block diagram illustrating a computing device 800 capable of fully or partially implementing a route search demand-based traffic volume estimation apparatus 100 according to an example embodiment of the present disclosure.

As illustrated in FIG. 8, the computing device 800 may include at least one processor 801, a computer-readable storage medium 802, and a communication bus 803.

The processor 801 may cause the computing device 800 to operate according to the example embodiments described above. For example, the processor 801 may execute one or more programs stored on the computer-readable storage medium 802. The one or more programs may include one or more computer-executable instructions, which, when executed by the processor 801, may be configured to cause the computing device 800 to perform operations according to example embodiments.

The computer-readable storage medium 802 may be configured to store the computer-executable instruction or program code, program data, and/or other suitable forms of information. A program 802*a* stored in the computer-readable storage medium 802 may include a set of instructions executable by the processor 801. In an example embodiment, the computer-readable storage medium 802 may be a memory (volatile memory such as a random access memory, non-volatile memory, or any suitable combination thereof), one or more magnetic disk storage devices, optical disk storage devices, flash memory devices, other types of storage media that are accessible by the computing device 800 and are capable of storing desired information, or any suitable combination thereof.

The communication bus 803 may interconnect various other components of the computing device 800, including the processor 801 and the computer-readable storage medium 802.

The computing device 800 may also include one or more input/output interfaces 805 providing an interface for one or more input/output devices 804, and one or more network communication interfaces 806. The input/output interface 805 and the network communication interface 806 may be connected to the communication bus 803. The network may be one of a cellular network, such as global system for mobile communications (GSM), enhanced data rates for GSM evolution (EDGE), general packet radio service (GPRS), code division multiple access (CDMA), time division-CDMA (TD-CDMA), universal mobile telecommunications system (UMTS), or long-term evolution (LTE), or another cellular network.

The input/output device 804 may be connected to other components of the computing device 800 through the input/output interface 805. The exemplary input/output device 804 may include a pointing device (such as a mouse or trackpad), a keyboard, a touch input device (such as a touchpad or touchscreen), a voice or sound input device, input devices such as various types of sensor devices and/or photographing devices, and/or output devices such as a display device, a printer, a speaker, and/or a network card. The exemplary input/output device 804 may be included in the computing device 800 as a component included in the computing device 800, or may be connected to the computing device 800 as a device distinct from the computing device 800.

Example embodiments of the present disclosure may include a program for performing the methods described herein on a computer, and a computer-readable recording medium including the program. The computer-readable recording medium may include, alone or in combination with program instructions, local data files, local data structures, and the like. The medium may be those specially designed and constructed for the purposes of the example embodiments, or may be of the well-known kind and available to those having skill in the computer software arts. Examples of the computer-readable medium include magnetic media such as hard disks, floppy disks, and magnetic tape, optical media such as CD ROM discs and DVDs, magneto-optical media such as optical discs, and hardware devices that are specially configured to store and perform program instructions, such as read-only memory (ROM), random access memory (RAM), flash memory, and the like. Examples of the program may include both a machine code, such as a code produced by a compiler, and a higher-level code that may be executed by the computer using an interpreter.

While example embodiments have been shown and described above, it will be apparent to those skilled in the art that modifications and variations could be made without departing from the scope of the present disclosure as defined by the appended claims.

The invention claimed is:

1. An apparatus for estimating a traffic volume based on demand for route search, the apparatus comprising:
- a processor; and
- a storage medium configured to record one or more programs configured to be executable by the processor;
- wherein the processor is configured to:
  - collect a plurality of pieces of route search data, each of the plurality of pieces of route search data including a road ID of each of a plurality of roads included in a route searched by a vehicle, and a predicted entry time for each road of the plurality of roads;
  - generate route search demand data based on the collected plurality of pieces of route search data, the route search demand data including a traffic volume for each road of the plurality of roads estimated based on the road ID and the predicted entry time, the traffic volume representing a number of vehicles;
  - correct the route search demand data by dispersing an excess demand traffic volume exceeding a marginal traffic volume from the overcrowded road to an upstream road connected in a reverse direction of travel, the marginal traffic volume being a maximum number of vehicles set for each road of the plurality of roads; and
  - estimate an actual traffic volume for a plurality of roads by inputting the corrected route search demand data to a pre-trained learning model.

2. The apparatus of claim 1, wherein the processor is configured to:
- repeatedly calculate a process of dispersing the excess demand traffic volume to the upstream road according to a preset percentage; and
- end the process of dispersing the excess demand traffic volume to the upstream road when a total sum of excess demand traffic volumes for respective roads, after dispersion is performed, is less than or equal to a certain percentage of a total sum of marginal traffic volumes for respective roads.

3. The apparatus of claim 1, wherein the route search demand data and the marginal traffic volume are represented by a matrix.

4. The apparatus of claim 1, wherein the processor is configured to perform dispersion according to:

$$D_{over,t}^{prop} = P_{prop,t} * D_{over,t},$$

where $$D_{over,t}^{prop}$$

is a matrix representing a dispersion volume for an excess demand traffic volume for each road at a specific point in time t, $P_{prop,t}$ is a matrix representing a dispersion percentage at the specific point in time t, and $D_{over,t}$ is a matrix representing an excess demand traffic volume for each road at the specific point in time t.

5. The apparatus of claim 4, wherein $P_{prop,t}$ is obtained by:

$$P_{prop,t} = \alpha * \text{diag}(U_{over,t}) * I + (1 - \alpha) * A,$$

where α is a constant, $U_{over,t}$ is a unit matrix of a matrix representing an excess demand traffic volume for each road at the specific point in time t, diag( ) is a function turning $U_{over,t}$ into a diagonal matrix, I is a unit matrix, and A is a matrix representing a connection relationship between roads according to the direction of travel.

6. The apparatus of claim 4, wherein the plurality of specific points in time have a predetermined time interval.

7. The apparatus of claim 1, wherein the pre-trained learning model includes a generative adversarial network (GAN) including a generator and a discriminator.

8. The apparatus of claim 7, wherein the processor is configured to train the discriminator using estimated traffic volume data, the estimated traffic volume data generated by the generator based on corrected route search demand data and actual traffic volume data, and then to train the generator in a direction of deceiving the trained discriminator.

9. A method for estimating a traffic volume based on demand for route search, the method comprising:

collecting, by a processor, a plurality of pieces of route search data, each of the plurality of pieces of route search data including a road ID of each of a plurality of roads included in a route searched by a vehicle, and a predicted entry time for each road of a plurality of roads;

generating route search demand data based on the collected plurality of pieces of route search data, the route search demand data including a traffic volume for each road of the plurality of roads estimated based on the road ID and the predicted entry time, the traffic volume representing a number of vehicles;

correcting the route search demand data by dispersing an excess demand traffic volume exceeding a marginal traffic volume from the overcrowded road to an upstream road connected in a reverse direction of travel, the marginal traffic volume being a maximum number of vehicles set for each road of the plurality of roads; and estimating an actual traffic volume for a plurality of roads by inputting the corrected route search demand data to a pre-trained learning model.

10. The method of claim 9, wherein the correcting further includes:

repeatedly calculating a process of dispersing the excess demand traffic volume to the upstream road according to a preset percentage; and ending the process of dispersing the excess demand traffic volume to the upstream road when a total sum of excess demand traffic volumes for respective roads, after dispersion is performed, is less than or equal to a certain percentage of a total sum of marginal traffic volumes for respective roads.

11. The method of claim 9, wherein the route search demand data and the marginal traffic volume are represented by a matrix.

12. The method of claim 9, wherein the dispersing includes performing dispersion according to:

$$D_{over,t}^{prop} = P_{prop,t} * D_{over,t},$$

where $$D_{over,t}^{prop}$$

is a matrix representing a dispersion volume for an excess demand traffic volume at a specific point in time t, $P_{prop,t}$ is a matrix representing a dispersion percentage at the specific point in time t, and $D_{over,t}$ is a matrix representing an excess demand traffic volume at the specific point in time t.

13. The method of claim 12, wherein $P_{prop,t}$ is obtained according to:

$$P_{prop,t} = \alpha * \text{diag}(U_{over,t}) * I + (1 - \alpha) * A,$$

where α is a constant, $U_{over,t}$ is a unit matrix of a matrix representing an excess demand traffic volume at the specific point in time t, diag( ) is a function turning $U_{over,t}$ into a square matrix, and A is a matrix representing a connection relationship between roads according to the direction of travel.

14. The method of claim 12, wherein the plurality of specific points in time have a predetermined time interval.

15. The method of claim 9, wherein the pre-trained learning model includes a generative adversarial network (GAN) including a generator and a discriminator.

16. The method of claim 15, further comprising:

training the discriminator using estimated traffic volume data, the estimated traffic volume data generated by the generator based on corrected route search demand data, and actual traffic volume data, and then training the generator in a direction of deceiving the trained discriminator.

* * * * *